(12) United States Patent
Tanada (10) Patent No.: US 9,367,238 B2
(45) Date of Patent: Jun. 14, 2016

(54) TERMINAL APPARATUS AND INPUT CORRECTION METHOD

(71) Applicant: FUJITSU LIMITED, Kawasaki-shi, Kanagawa (JP)

(72) Inventor: Tosaku Tanada, Tachikawa (JP)

(73) Assignee: FUJITSU LIMITED, Kawasaki (JP)

( * ) Notice: Subject to any disclaimer, the term of this patent is extended or adjusted under 35 U.S.C. 154(b) by 41 days.

(21) Appl. No.: 14/292,203

(22) Filed: May 30, 2014

(65) Prior Publication Data

US 2014/0368260 A1 Dec. 18, 2014

(30) Foreign Application Priority Data

Jun. 12, 2013 (JP) .................................. 2013-123748

(51) Int. Cl.
*G06F 3/0488* (2013.01)
(52) U.S. Cl.
CPC .. *G06F 3/04883* (2013.01); *G06F 2203/04808* (2013.01)
(58) Field of Classification Search
None
See application file for complete search history.

(56) References Cited

U.S. PATENT DOCUMENTS

| | | | |
|---|---|---|---|
| 6,504,530 B1 * | 1/2003 | Wilson et al. | 345/173 |
| 6,831,631 B2 * | 12/2004 | Chuang | 345/173 |
| 7,248,249 B2 * | 7/2007 | Kong et al. | 345/173 |
| 8,125,454 B2 * | 2/2012 | Kong et al. | 345/173 |
| 9,046,958 B2 * | 6/2015 | Colley et al. | |
| 2009/0174679 A1 | 7/2009 | Westerman | |
| 2010/0053116 A1 * | 3/2010 | Daverman et al. | 345/175 |
| 2012/0023459 A1 | 1/2012 | Westerman | |
| 2012/0098783 A1 * | 4/2012 | Badaye et al. | 345/174 |
| 2012/0262407 A1 * | 10/2012 | Hinckley et al. | 345/173 |
| 2013/0207913 A1 * | 8/2013 | Takashima et al. | 345/173 |
| 2014/0028575 A1 * | 1/2014 | Parivar et al. | 345/173 |
| 2014/0104225 A1 * | 4/2014 | Davidson et al. | 345/174 |
| 2014/0313162 A1 * | 10/2014 | Jo | 345/174 |
| 2015/0205412 A1 * | 7/2015 | Kim et al. | G06F 3/044 |

FOREIGN PATENT DOCUMENTS

| | | |
|---|---|---|
| JP | 2009-217814 A | 9/2009 |
| JP | 2010-020405 A | 1/2010 |
| JP | 2011-237945 A | 11/2011 |

* cited by examiner

*Primary Examiner* — Thomas J Hiltunen
(74) *Attorney, Agent, or Firm* — Fujitsu Patent Center (57) ABSTRACT

A terminal apparatus includes a touch panel, a controller to detect a contact position of a first contact on the touch panel, a pressure applied by the first contact, a contact position of a second contact on the touch panel and a pressure applied by the second contact, and a processor executing a process that causes the terminal apparatus to determine whether or not the contact position of the first contact meets a predetermined condition, determine a magnitude relationship between the pressure applied by the first contact and the pressure applied by the second contact, and invalidate the contact position of the first contact when the contact position of the first contact meets the predetermined condition and it is determined that the pressure applied by the first contact is equal to or higher than the pressure applied by the second contact.

20 Claims, 6 Drawing Sheets

TERMINAL APPARATUS AND INPUT CORRECTION METHOD

CROSS-REFERENCE TO RELATED APPLICATION

This application is based upon and claims the benefit of priority of the prior Japanese Patent Application No. 2013-123748, filed on Jun. 12, 2013, the entire contents of which are incorporated herein by reference.

FIELD

The embodiments described herein are related to a terminal apparatus, an input correction method and a non-transitory recording medium storing an input correction program.

BACKGROUND

The number of users of information processing terminals such as smartphone, tablet PC (Personal Computer) and PDS (Personal Data Assistance) is increasing lately.

And information processing terminals equipped with touch panels as input device become popular.

The information processing terminals equipped with touch panels include input devices provided with display devices such as LCD (Liquid Crystal Display).

The information processing terminals further include devices such as touch pad for detecting the coordinates of the contact locations of user operations.

A user performs predetermined touch operations on the touch panel of the information processing terminal to achieve scroll, enlarge and shrink the displaying area of the images displayed by the terminal.

The following patent documents describe conventional techniques related to the techniques described herein.

PATENT DOCUMENT

[Patent document 1] Japanese Laid-Open Patent Publication No. 2009-217814
[Patent document 2] Japanese Laid-Open Patent Publication No. 2011-237945
[Patent document 3] Japanese Laid-Open Patent Publication No. 2010-020405

SUMMARY

According to an aspect of the embodiments, it is provided a terminal apparatus, including a touch panel, a controller to detect a contact position of a first contact on the touch panel, a pressure applied to the touch panel by the first contact, a contact position of a second contact on the touch panel and a pressure applied to the touch panel by the second contact, and a processor executing a process that causes the terminal apparatus to determine whether or not the detected contact position of the first contact meets a predetermined condition, determine a magnitude relationship between the detected pressure applied by the first contact and the detected pressure applied by the second contact, and invalidate the detected contact position of the first contact when the detected contact position of the first contact meets the predetermined condition and it is determined that the detected pressure applied by the first contact is equal to or higher than the detected pressure applied by the second contact.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The size of the display for displaying contents etc. of the display screen of the above information processing terminal is increased by providing a touch panel to cover almost the whole area of the surface of the information processing terminal. Therefore, it may occur that a user's finger of the hand holding the information processing terminal touches the touch panel to induce an erroneous operation. For example, when a user uses an information processing terminal such as tablet PC, which is relatively larger than a portable device, the user supports the weight of the information processing terminal with the opposite hand of the hand used for touch operations and performs the touch operations such as scrolling, enlarging or shrinking the display area. In this case, the thumb of the hand holding the information processing terminal is in contact with the edge of the touch panel on the surface of the information processing terminal. When the user uses a finger of the opposite hand of the hand holding the information processing terminal to perform touch operations under such situation, the information processing terminal detects the thumb which has already been in contact with the touch panel and the finger used for the touch operations, which may lead to multi-touch operations. When the information processing terminal detects the multi-touch operation, the information processing terminal determines the user input to the touch panel according to the touch position of the finger which has already been in contact with the touch panel and the touch position of the finger used for the touch operation. For example, a single-touch operation for scrolling the display area may be determined as a movement between the two positions indicated by the finger which has already been in contact with the touch panel and the finger used for the touch operation. As a result, the single-touch operation for scrolling the display area may be recognized as a pinch-out or pinch-in operation for enlarging or shrinking the display area, which the user does not intend to perform by the single-touch operation. Thus, the display area of the image such as contents which the user wants to scroll may unexpectedly be enlarged or shrunk. Therefore, it is provided in the embodiment a technique for reducing erroneous operations when multi-touch operations are detected in the information processing terminal. First, A terminal apparatus according to one embodiment is described below with reference to the drawings. The embodiments described below are only examples and the configurations of the terminal apparatus are not limited those disclosed in the embodiments.

The terminal apparatus is described below based on FIGS. 1 to 7.

Comparative Example

Figure 1:
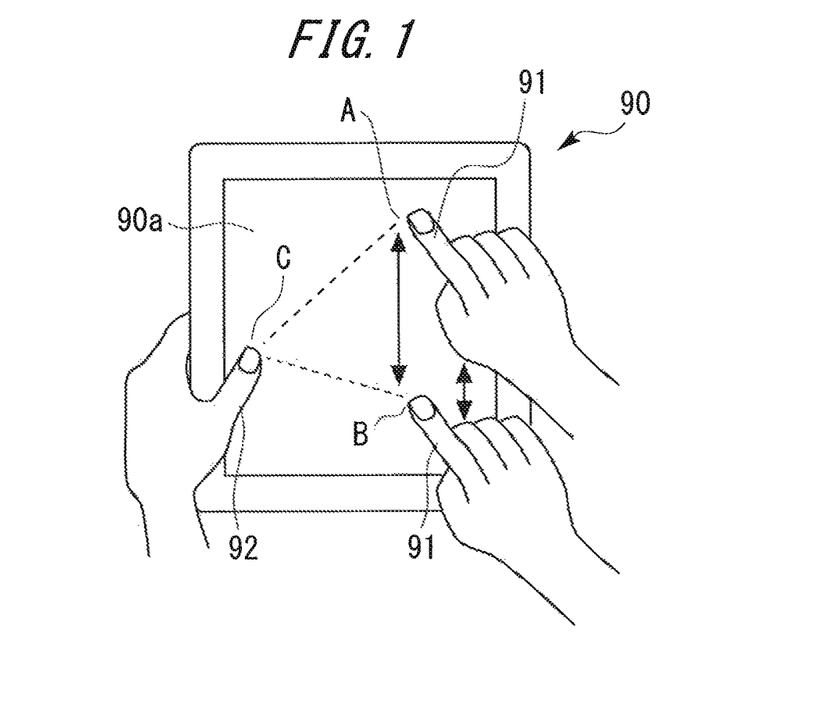
FIG. 1 is a diagram illustrating a touch operation of a terminal apparatus.

FIG. 1 illustrates an explanatory diagram of a touch operation of an information processing terminal (terminal apparatus) such as tablet PC (Personal Computer). In the explanatory diagram in FIG. 1, a terminal apparatus 90 is an information processing terminal such as tablet PC. The terminal apparatus 90 includes a touch panel 90a as input device on the surface. The touch panel 90a is, for example, an input device which combines a display device such as LCD (Liquid Crystal Display) and a detection device of the coordinates of the touch positions of user's touch operations.

The terminal apparatus 90 as illustrated in FIG. 1 displays images of content etc. on the display device of the touch panel 90a. The user of the terminal apparatus 90 performs a single-touch operation to an image displayed on the display device of the touch panel 90a by making an operation finger 91 such as an index finger contact with the touch panel 90a. For example, when the user performs the touch operation, the user holds the terminal apparatus 90 with the opposite hand of the hand of the operation finger 91 to maintain the position of the contact surface of the touch panel 90a on which the operation finger 91 is placed.

The user places the operation finger 91 on the image displayed on the touch panel 90a with the position of the contact surface for the operation finger 91 fixed. The contact position of the operation finger 91 which is placed on the image displayed on the display device of the touch panel 90a is detected by a device to detect the coordinate of the contact position on the touch panel 90a. The terminal apparatus 90 performs processes such as moving the display position of the image to the contact position, enlarging or shrinking the displayed image.

For example, when the display area of a display image displayed by the terminal apparatus 90 is scrolled, the user performs a single-touch operation to move the operation finger 91 which is placed on the display image toward the scroll direction. For example, the user performs a flick operation by flicking the operation finger 91 which is placed on the display image and in contact with the touch panel 90a toward the scroll direction. In addition, the user performs a swipe operation by sliding the operation finger 91 which is placed on the display image and in contact with the touch panel 90a toward the scroll direction. The terminal apparatus 90 detects the touch position of the operation finger 91 on the touch panel 90a and the direction of the finger movement to scroll the display image displayed by the display device according to the direction of movement of the operation finger 91.

The example as illustrated in FIG. 1 is an example in which the display image is scrolled by a user's swipe operation. In FIG. 1, the position A indicates a position at which the user's operation finger 91 is in contact with the touch panel 90a and placed on the image displayed on the touch panel 90a. Similarly, the position B indicates a position at which the user's operation finger 91 is in contact with the touch panel 90a after the user performs the swipe operation. When the user performs the swipe operation as illustrated in FIG. 1, the display position of the image displayed at the position A is scrolled in the direction toward the position B at which the operation finger 91 is in contact with the touch panel 90a after the swipe operation. Further, the display position of the image displayed at the position A is moved to the position B.

As illustrated in FIG. 1, a finger 92 of the hand holding the terminal apparatus 90 is unexpectedly in contact with the touch panel 90a when the user performs a single-touch operation for scrolling the display image. In this case, the terminal apparatus 90 detects the position C as the contact position of the finger 92 which is in contact with the touch panel 90a and the position C as the contact position of the operation finger 91 for performing the single-touch operation which is also in contact with the touch panel 90a. That is, the terminal apparatus 90 may recognize the touch operation by the operation finger 91 as a multi-touch operation by the operation finger 91 and the finger 92 and perform processes corresponding to the multi-touch operation.

In the example as illustrated in FIG. 1, the terminal apparatus 90 calculates the distance between the position A at which the operation finger 91 is in contact with the touch panel 90a and the position C at which the finger 92 is in contact with the touch panel 90a. And the terminal apparatus 90 performs, for example, a pinch operation for enlarging or shrinking the image displayed on the touch panel 90a according to the relative distance between the position C and the position of the operation finger 91 moving from the position A to the position B. That is, when the finger is in contact with the touch panel 90a, a single-touch operation for scrolling the display image is determined as a multi-touch operation. And when the single-touch operation is recognized as the multi-touch operation, the terminal apparatus 90 performs the pinch operation based on the operation finger 91 and the finger 92 which are recognized as the multi-touch operation. As a result, the display image is enlarged or shrunk despite the user's intentions.

Embodiments

Figure 2:
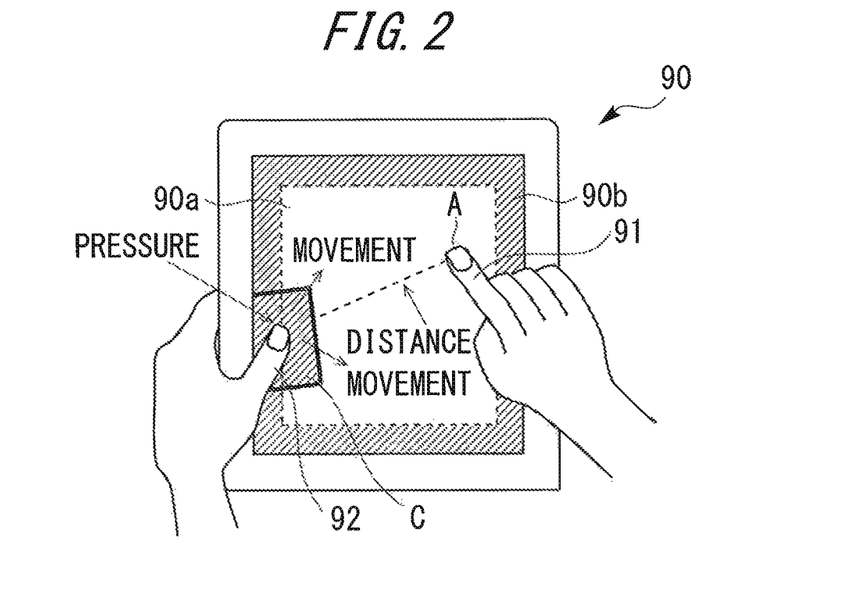
FIG. 2 is a diagram illustrating a tendency of a multi-touch operation by which an erroneous operation is caused.

When a single-touch operation is recognized as an erroneous operation because the finger 92 of the hand holding the terminal apparatus 90 is in contact with the touch panel 90a, the following tendencies (1) to (3) can be found. It is noted that FIG. 2 illustrates the tendencies of the movements of finger 92 with which a single-touch operation induces an erroneous operation. The tendencies in a case in which an erroneous operation occurs due to the operation finger 91 and the finger 92 holding the terminal apparatus 90 which are in contact with the touch panel 90a are described with reference to FIG. 2.

(1) In FIG. 2, the finger 92 of the hand holding the terminal apparatus 90 tends to be in contact with the edge part 90b of the touch panel 90a. And the area indicated by the edge part 90b can be specified by a predetermined width determined by the length of the finger 92, the thumb for example, which is contact with the edge part 90b. In addition, the contact position of the finger 92 in the edge part 90b which is indicated by the position C tends not to move, that is, tends to stay at the position C, at least while the single-operation is being performed.

(2) As illustrated in FIG. 1, when the user performs the single-touch operation, the user maintains the position of the contact surface of the touch panel 90a with which the operation finger 91 is in contact while holding the weight of the terminal apparatus 90 with a hand. Therefore, the pressure applied to the touch panel 90a by the finger 92 which is in contact with the edge part 90b of the touch panel 90a tends to differ from the pressure applied to the touch panel 90a by the operation finger for performing the touch operation. In addition, as for this pressure difference, the pressure applied by the finger 92 which is in contact with the edge part 90b tends to be higher than the pressure applied by the operation finger 91 for performing the touch operation at least while the single-touch operation is being performed.

(3) Further, regarding the positions at which the operation finger 91 and the finger 92 are in contact with the edge part 90b, the distance between the position A and the position C can be relatively long as illustrated in FIG. 2. For example, when the user performs a pinch operation such as enlarging or shrinking an image displayed on the touch panel 90a, the user performs a multi-touch operation with the opposite hand of the hand holding the terminal apparatus 90. The multi-touch operation related to the pinch operation involves placing the thumb and the index finger of the opposite hand or the thumb and the middle finger of the opposite hand on the display image and increasing or decreasing the distance between the two fingers placed on the touch panel 90a. As illustrated in FIG. 2, the multi-touch operation caused accidentally by the single-touch operation as described above is not a multi-touch operation which the user intends to perform. Therefore, the distance between the operation finger 91 and the finger 92 placed in the edge part 90b on the touch panel 90a when the user performs the single-touch operation can be relatively longer than the distance between the contact positions of the fingers used for performing the above normal multi-touch operation.

The information processing terminal according to the present embodiment, hereinafter referred to as terminal apparatus, detects pressures at one contact position and the other contact position on the touch panel in a multi-touch operation and determines the magnitude relationship between the two detected pressures. And the terminal apparatus according to the present embodiment can appropriately determine the user operation based on a certain condition related to the determined magnitude relationship. Here, the predetermined relationship is, for example, a relationship in which one detected pressure is more than the other detected pressure and more than a predetermined threshold. As a result, the terminal apparatus can reduce occurrences of erroneous operations cause by the detected multi-touch operations even when a finger of the hand holding the terminal apparatus is in contact with the touch panel.

<Apparatus Configurations>

Figure 3:
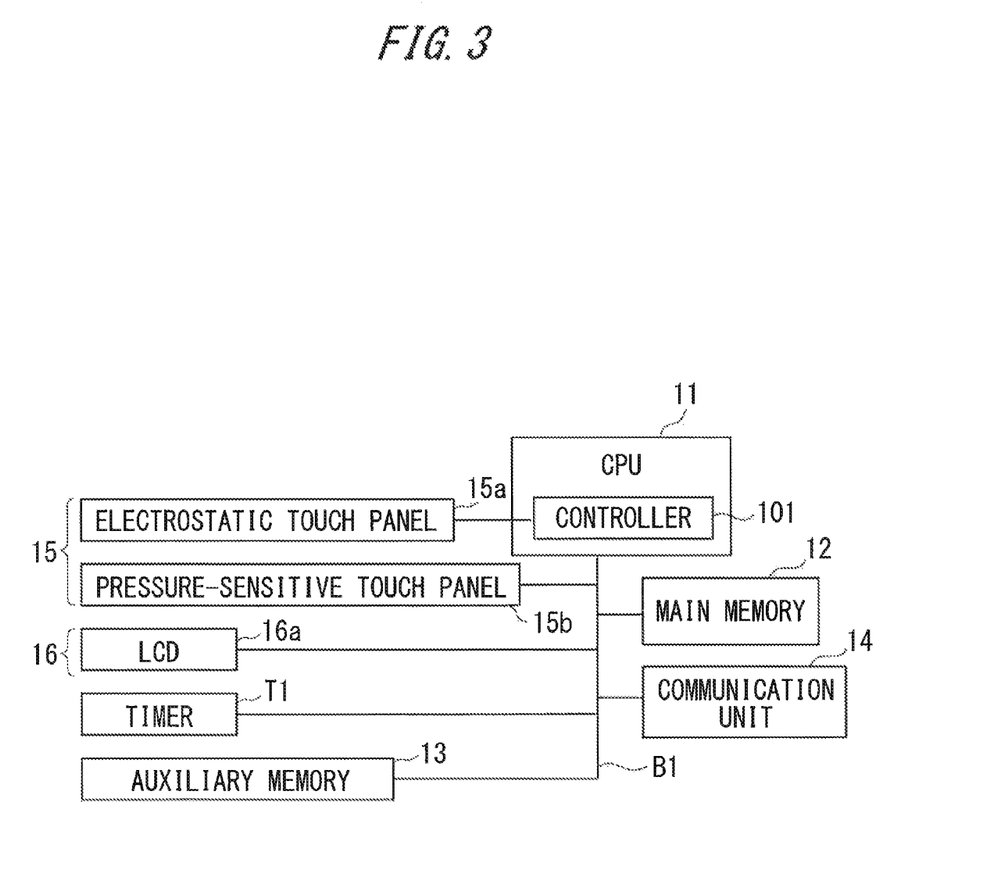
FIG. 3 is a diagram illustrating an example of hardware configurations of a terminal apparatus according to an embodiment.

FIG. 3 illustrates a hardware configuration of the terminal apparatus according to the present embodiment. The terminal apparatus 10 as illustrated in FIG. 1 is a portable information processing terminal such as smartphone, PDA and table PC. The terminal apparatus 10 includes a CPU (Central Processing Unit) 11, a main memory 12, an auxiliary memory 13, a communication unit 14, an input unit 15 and an output unit 16 which are connected with each other via a connection bus B1. The main memory 12 and the auxiliary memory 13 are readable and writable storage media used for the portable terminal apparatus 10.

In the terminal apparatus 10, the CPU 11 deploys programs stored in the auxiliary memory 13 in the work area in the main memory 12 and executes the programs to control the peripheral apparatus. As a result the terminal apparatus 10 can perform functions according to intended purposes.

For example, the terminal 10 uses a browser function to connect with a network such as the Internet via the communication unit 14 and receives a variety of services provided on the network. The services provided on the network includes receiving and sending emails, joining in a SNS (Social Networking Service), distributing information such as disaster information, downloading games, images, video and music etc.

The user of the terminal apparatus 10 displays a downloaded image by the output unit 16 to view the contents provided on the network, for example. The user of the terminal apparatus 10 places a predetermined finger or fingers on a displayed image while the user is viewing the contents and performs pinch operations including scrolling, enlarging and shrinking the displayed image.

The terminal apparatus 10 detects the contact made by the operation finger(s) related to the user operations via an input device such as electrostatic touch panel 15a included in the input unit 15. In addition, the terminal apparatus 10 according to the present embodiment detects the pressure of the operation finger(s) via an input device such as pressure-sensitive touch panel included in the input unit 15. And the terminal apparatus 10 according to the present embodiment determines appropriate operations which the user intends to perform based on the relationships between each detected pressure when a multi-touch operation is detected. Thus, the terminal apparatus 10 according to the present embodiment can reduce erroneous operations when the multi-touch operations are detected.

In the terminal apparatus 10 as illustrated in FIG. 1, the CPU 11 is a central processing unit for controlling the whole terminal apparatus 10. The CPU 11 performs processes according to executed programs stored in the auxiliary memory 13. The main memory 12 is a memory medium used by the CPU 11 to cache the programs and data and deploy work areas. The main memory 12 includes a RAM (Random Access Memory) and a ROM (Read Only Memory), for example.

The auxiliary memory 13 stores a variety of programs and data in a storage medium with the programs and data being readable and writeable. The auxiliary memory 13 stores OS (Operating System), a variety of programs, a variety of tables and the like. The OS includes a communication interface program for receiving data from and sending data to external devices connected via the communication unit 14. The external device includes an information processing apparatus such as server, an external storage apparatus and a terminal apparatus including a telephone function and a communication function on the network.

The auxiliary memory 13 is, for example, an EPROM (Erasable Programmable ROM), a USB (Universal Serial Bus) memory, a memory card and the like. It is noted that the auxiliary memory 13 may include a solid state drive apparatus, an HDD (Hard Disk Drive), a CD drive apparatus, a DVD drive apparatus, a BD drive apparatus and the like. The storage media includes a silicon disk such as a non-volatile semiconductor memory, namely, flush memory, a hard disk, a CD, a DVD and a BD.

The communication unit 14 is an interface for the network etc., for example. The network connected with the terminal apparatus 10 includes a public network such as the Internet and a wireless network such as mobile phone network including communication base stations.

The input unit 15 accepts operation instructions etc. from users. The input unit 15 is an input device such as a microphone, an input button, an input key, a pointing device, a touch panel and a camera. The terminal apparatus 10 according to the present embodiment includes an electrostatic touch panel 15a and a pressure-sensitive touch panel 15b as input device. The information input by the input unit 15 is notified to the CPU 11 via the connection bus B1.

The electrostatic touch panel 15*a* is a capacitance type touch panel and detects the contact position of an operation finger by detecting the variation of the capacitance between the conductive film of the electrostatic touch panel 15*a* and the operation finger which is in contact with the electrostatic touch panel 15*a*.

In addition, the pressure-sensitive touch panel 15*b* is a resistive touch panel and detects the voltage (current) at the contact position on the pressure-sensitive touch panel 15*b* by a resistance film printed on the pressure-sensitive touch panel 15*b*. For example, the controller 101 stores in the auxiliary memory 13 in advance a table which contains voltage values (current values) detected by the pressure-sensitive touch panel and the corresponding pressure values. The controller 101 refers to the table to determine the pressure at the contact position.

The output unit 16 outputs data processed by the CPU 11 and data stored in the main memory 12. The output unit 16 includes an LCD (Liquid Crystal Display) 16*a* as display device for displaying the contents such as display images. It is noted that the output unit 16 of the terminal apparatus 10 can include a display device such as an EL (Electro Luminescence) panel and an organic EL panel and an output device such as a speaker. The timer T1 is provided for the terminal apparatus 10 and includes a timer function for time measurement.

In the terminal apparatus 10 according to the present embodiment, the CPU 11 reads the OS, programs and data stored in the auxiliary memory 13 and deploys in the main memory 12 to execute the corresponding processes. When the corresponding processes are executed, the functions of the controller 101 are achieved in the terminal apparatus 10. In addition, the auxiliary memory 13 includes a predetermined storage area for storing the data referred or administered in the terminal apparatus 10. The auxiliary memory 13 stores determination conditions, namely, thresholds, used for processes performed by the controller 101 as described later with reference to FIGS. 4 to 7.

The controller 101 can appropriately determine the user operations related to the multi-touch operations based on the predetermined magnitude relationships regarding the detected pressures and then reduce erroneous operations when the multi-touch operations are detected. The details of the processes performed by the controller 101 are described along with the descriptions of the processes as illustrated in FIGS. 4 to 7.

<Process Flow>

The processes for preventing an erroneous operation from occurring when a multi-touch operation is detected in the terminal apparatus 10 according to the present embodiment are described with reference to FIGS. 4 to 7. It is noted that the processes for preventing the erroneous operation when the multi-touch operation is detected in the terminal apparatus 10 are described in the following four process examples 1 to 4.

Process Example 1

Figure 4:
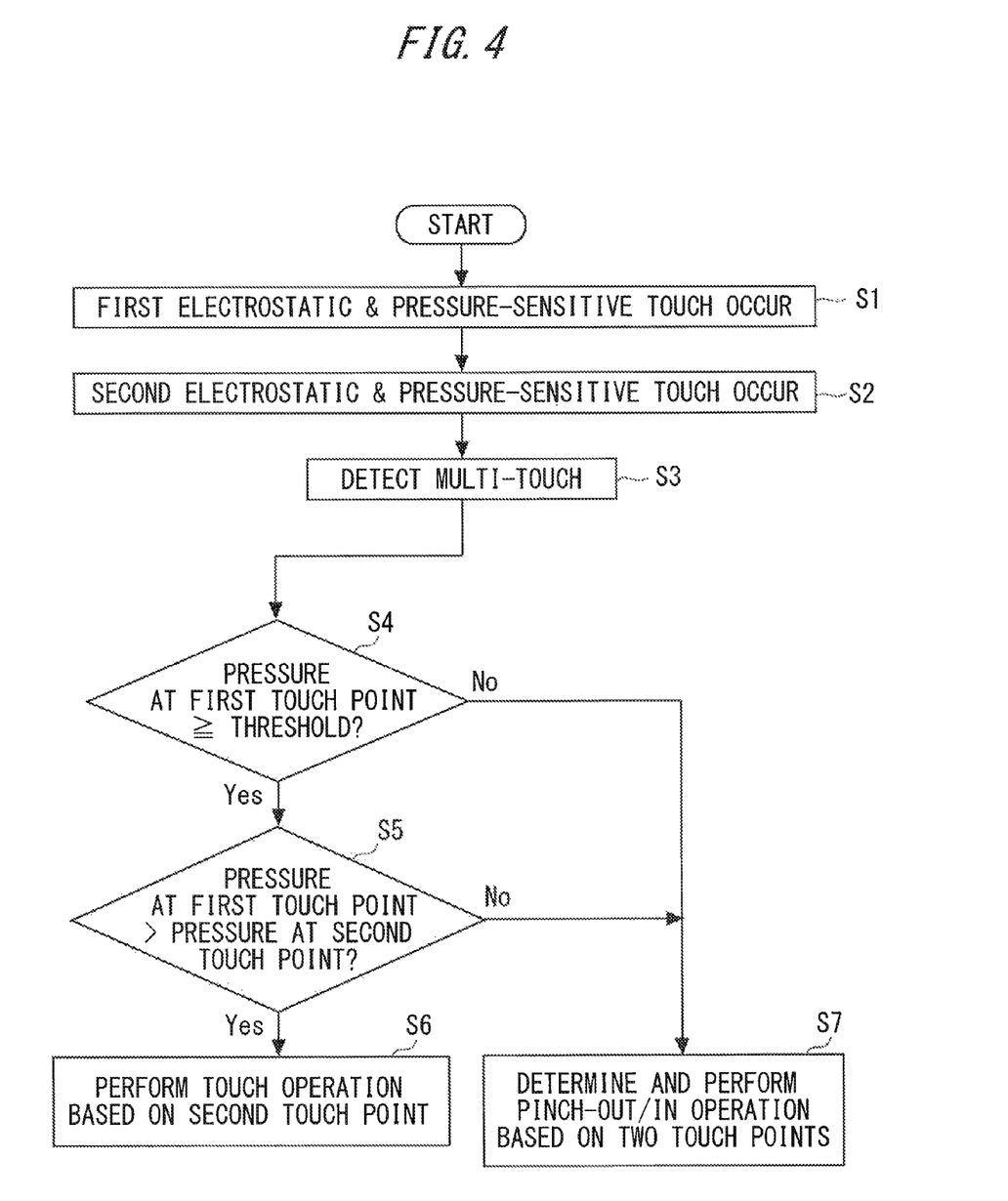
FIG. 4 is a flowchart exemplifying processes for preventing erroneous operations in process example 1 according to the present embodiment

The terminal apparatus 10 in Process Example 1 performs the processes for preventing the erroneous operation in the multi-touch operation by detecting the difference between the pressure applied by the operation finger 91 and the pressure applied by the finger 92 of the hand holding the terminal apparatus 10 which are respectively in contact with the touch panel. FIG. 4 illustrates a flowchart of the processes performed for reducing erroneous operations by detecting the pressure difference. It is noted that the flowchart as illustrated in FIG. 4 assumes that the first and second contacts detected by the electrostatic touch panel 15*a* and the pressure-sensitive touch panel 15*b* are "the first touch point" and "the second touch point", respectively.

In the flowchart as illustrated in FIG. 4, the processes for preventing the erroneous operation are started when a multi-touch operation is detected after the power-on of the terminal apparatus 10, for example. The terminal apparatus 10 detects the contact made by the finger 92 of the hand holding the terminal apparatus 10 as "the first touch point" via the electrostatic touch panel 15*a* and the pressure-sensitive touch panel 15*b* (S1). In addition, the terminal apparatus 10 detects the contact made by the operation finger 91 as "the second touch point" via the electrostatic touch panel 15*a* and the pressure-sensitive touch panel 15*b* (S2). And then the terminal apparatus 10 determines that a multi-touch operation is detected (S3).

The terminal apparatus 10 temporarily stores the contact positions of the first and second touch points detected by the electrostatic touch panel 15*a* in a predetermined area in the main memory 12, for example. Also, the terminal apparatus 10 temporarily stores the pressures at the first and second touch points detected by the pressure-sensitive touch panel 15*b* in a predetermined area in the main memory 12, for example. It is noted that the terminal apparatus 10 may associate the contact positions of the touch points detected by the electrostatic touch panel 15*a* and the pressures at the touch points detected by the pressure-sensitive touch panel 15*b* and store the associations in a predetermined area in the main memory 12.

When the terminal apparatus 10 detects the multi-touch operation, the terminal apparatus 10 performs determination processes S4 and S5 for preventing an erroneous operation based on each pressure detected at each touch point.

The terminal apparatus 10 determines whether or not the pressure at the first touch point detected in S1 is equal to or higher than a predetermined threshold (S4). As described with reference to FIG. 2, the pressure applied by a finger of the hand holding the terminal apparatus 10 tends to be larger than the pressure applied by an operation finger performing a single-touch operation. Therefore, the terminal apparatus 10 can determine whether or not the touch point is a contact position made by a finger used when the user holds the terminal apparatus 10 with a hand by determining whether or not the pressure detected at the touch point is equal to or higher than the predetermined threshold. It is noted that the threshold can be defined based on pressures experimentally measured in advance when a user holds the terminal apparatus 10 with a finger of the hand holding the terminal apparatus 10 being in contact with the touch panel. The terminal apparatus 10 can store the defined threshold in a predetermined storage area in the auxiliary memory 13, for example.

In the flowchart as illustrated in FIG. 4, when the terminal apparatus 10 determines in S4 that the pressure at the first touch point detected in S1 is lower than the predetermined threshold (S4: No), the process proceeds to the process in S7. In the process in S7, the terminal apparatus 10 performs processes according to the multi-touch determination detected in S1 and S2.

The terminal apparatus 10 performs, for example, a pinch operation based on the contact positions of the first touch point detected in S1 and of the second touch point detected in S2. It is noted that the pinch operation includes a pinch-out process for enlarging a displayed image etc. and a pinch-in process for shrinking a displayed image etc. The terminal apparatus 10 according to the present embodiment performs the pinch-out process or the pinch-in process according to the increase or the decrease of the distance between the contact positions of the touch points detected in S1 and S2.

When the terminal apparatus 10 determines in S4 that the pressure at the first point detected in S1 is equal to or higher than the predetermined threshold (S4: Yes), the process proceeds to the determination process in S5.

In the process in S5, the terminal apparatus 10 determines the relative magnitude (high and low) relationship between the pressures detected at the respective touch points. As described with reference to FIG. 2, the pressure applied by the finger of the hand holding the terminal apparatus 10 tends to be higher than the pressure applied by the operation finger used for performing the single-touch operation. The terminal apparatus 10 can determine that the touch point at which a higher pressure is applied is a contact position detected because the user touches the touch panel with a finger of the hand holding the terminal apparatus 10 by determining the relative magnitude (high and low) relationship between the pressures detected at the respective touch points. The terminal apparatus 10 compares, for example, the pressure at the first touch point detected in S1 and the pressure at the second touch point detected in S2. And the terminal apparatus 10 determines whether or not the pressure at the first touch point is higher than the pressure at the second touch point.

When the terminal apparatus 10 determines in S5 that the pressure at the first touch point detected in S1 is not higher than the pressure at the second touch point detected in S2 (S5: No), the process proceeds to S7. On the other hand, the terminal apparatus 10 determines in S5 that the pressure at the first touch point detected in S1 is higher than the pressure at the second touch point detected in S2 (S5: Yes), the process proceeds to S6.

In the process in S6, the terminal apparatus 10 performs a single-touch operation according to the second touch point detected in S2. The terminal apparatus 10 performs, for example, scrolling a displayed image by detecting a flick operation or a swipe operation regarding the second touch point detected in S2.

It is noted that the process performed by the terminal apparatus 10 in S1 is an example of a process for detecting a contact position of the first contact and a pressure applied by the first contact. In addition, the CPU 11 etc. of the terminal apparatus 10 performs the process in S1 as an example of the process for detecting the contact position of the first contact and the pressure applied by the first contact.

Further, it is noted that the process performed by the terminal apparatus 10 in S2 is an example of a process for detecting a contact position of the second contact and a pressure applied by the second contact. In addition, the CPU 11 etc. of the terminal apparatus 10 performs the process in S2 as an example of the process for detecting the contact position of the second contact and the pressure applied by the second contact.

Further, it is noted that the process performed by the terminal apparatus 10 in S4 is an example of a process for determining whether or not the first contact meets a predetermined condition. In addition, the CPU 11 etc. of the terminal apparatus 10 performs the process in S4 as an example of the process for determining whether or not the first contact meets a predetermined condition.

Additionally, it is noted that the process performed by the terminal apparatus 10 in S5 is an example of a process for determining the magnitude relationship between the pressure applied by the first contact and the pressure applied by the second contact. In addition, the CPU 11 etc. of the terminal apparatus 10 performs the process in S5 as an example of the process for determining the magnitude relationship between the pressure applied by the first contact and the pressure applied by the second contact.

Additionally, it is noted that the process performed by the terminal apparatus 10 in S6 is an example of a process for invalidating the contact position of the first contact when it is determined that the first contact meets the predetermined condition and the pressure applied by the first contact is higher than the pressure applied by the second contact. In addition, the CPU 11 etc. of the terminal apparatus 10 performs the process in S6 as an example of the process for invalidating the contact position of the first contact when it is determined that the first contact meets the predetermined condition and the pressure applied by the first contact is higher than the pressure applied by the second contact.

Moreover, it is noted that the process performed by the terminal apparatus 10 in S7 is an example of a process for performing a process according to an input operation based on the contact position of the first contact and the contact position of the second contact when the contact position of the first contact meets the predetermined condition and the pressure applied by the first contact is lower than the pressure applied by the second contact. In addition, the CPU 11 etc. of the terminal apparatus 10 performs the process in S7 as an example of the process for performing a process according to an input operation based on the contact position of the first contact and the contact position of the second contact when the contact position of the first contact meets the predetermined condition and the pressure applied by the first contact is lower than the pressure applied by the second contact.

As described above, when the terminal apparatus 10 according to the present embodiment detects a multi-touch operation, the terminal apparatus 10 determines whether or not the pressure at one touch point is equal to or higher than the threshold. And when the terminal apparatus 10 determines that the pressure at the touch point is equal to or higher than the threshold, the terminal apparatus 10 determines the relative magnitude between the pressure at one touchpoint and the pressure at the other touch point. As a result, the terminal apparatus 10 can recognize the touch point detected due to a finger of the hand holding the terminal apparatus 10. It is noted that when the terminal apparatus 10 according to the present embodiment determines that the pressure at one touch point is equal to or higher than the threshold and higher than the pressure at the other touch point the terminal apparatus 10 can invalidate one touch point and perform a single-touch operation according to the other touch point. In addition, when the terminal apparatus 10 determines that the pressure at one touch point is equal to or higher than the threshold and lower than the pressure at the other touch point, the terminal apparatus 10 can, for example, detect a multi-touch operation by the touch points and perform a pinch operation determined by the distance between the touch points. Further, the terminal apparatus 10 according to the present embodiment can determine which finger the operation finger is based on the pressure relationship between the touch points made by a specific finger and another finger. Thus, since the terminal apparatus 10 according to the present embodiment can appropriately determine the user operations even when a finger of the hand holding the terminal apparatus 10 is in contact with the touch panel, the terminal apparatus 10 can reduce erroneous operations.

Moreover, since the terminal apparatus 10 according to the present embodiment can distinguish a finger of the hand holding the terminal apparatus 10 from the operation finger based on the pressure at each touch point, the terminal apparatus 10 can eliminate the setting of an area in an edge part on the touch panel in which user operations are invalidated in order to prevent erroneous operations. Thus, the size of the operation area for touch operations can be similar to the size of the display area of the screen in the terminal apparatus 10 according to the present embodiment.

Process Example 2

Figure 5:
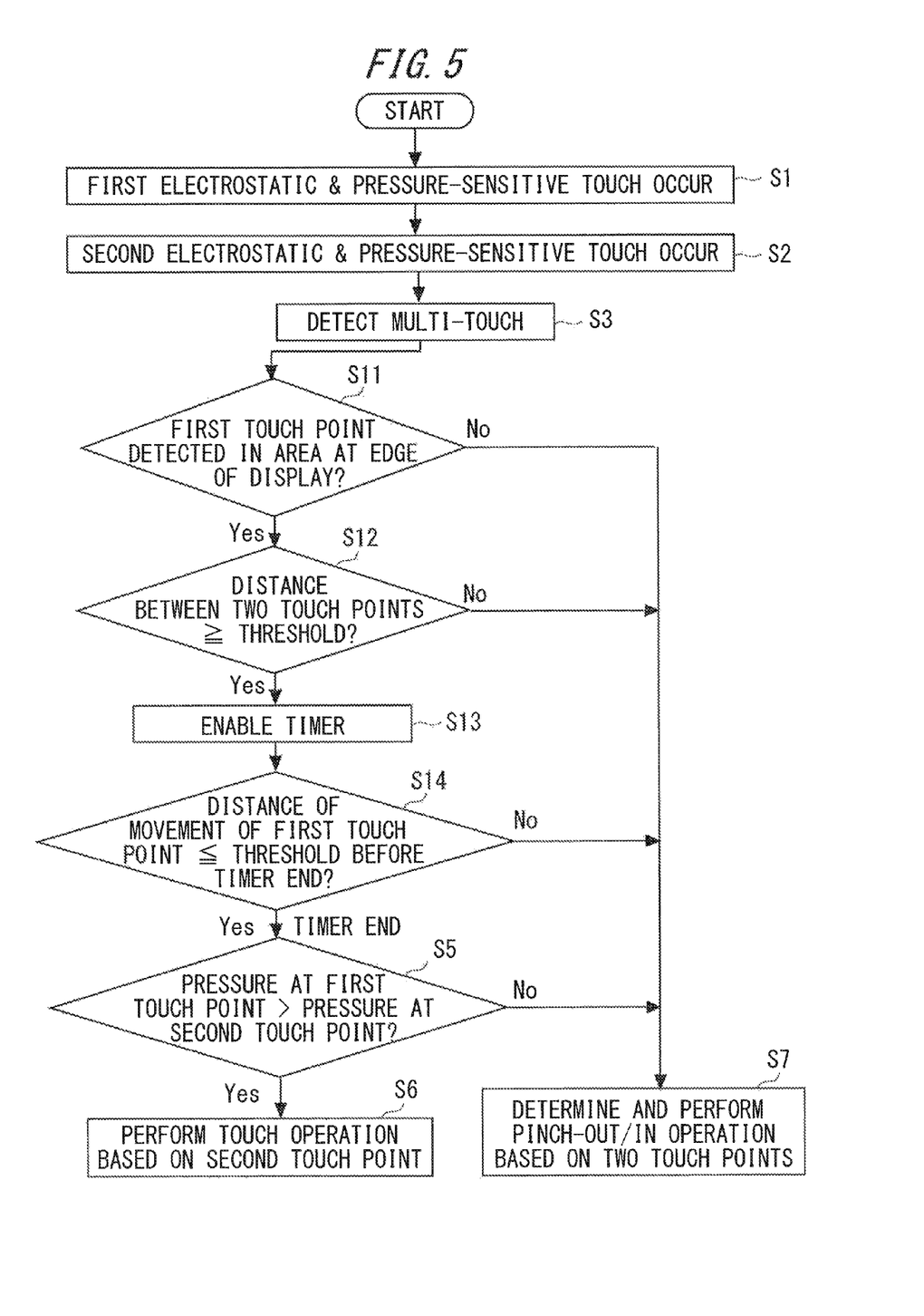
FIG. 5 is a flowchart exemplifying processes for preventing erroneous operations in process example 2 according to the present embodiment.

Next, the processes for preventing an erroneous operation from occurring when a multi-touch operation is detected in Process Example 2 with reference to the flowchart as illustrated in FIG. 5. In the processes for preventing the erroneous operation in Process Example 2, the terminal apparatus 10 additionally determines the contact position and the movement of one touch point and further determines the distance between one touch point and the other touch point.

The processes for preventing the erroneous operation as illustrated in FIG. 5 differ from the processes as illustrated in FIG. 4 in that the processes in FIG. 5 include S11 to S14. Therefore, the processes in S11 to S14 are mainly described in the following descriptions.

In S11 in the flowchart as illustrated in FIG. 5, the terminal apparatus 10 determines whether or not the position of the first touch point detected in S1 is in the area of the edge part on the display. For example, the terminal apparatus 10 determines whether or not the position of the first touch point detected in S1 is in the area of the edge part 90b as illustrated in FIG. 2. As described with reference to FIG. 2, the contact position of the finger of the hand holding the terminal apparatus 10 tends to be inside the area of the edge part of the display. It is noted that the setting information for the area of the edge part of the display can be stored as mapping information in a predetermined storage area in the auxiliary memory 13.

In the flowchart as illustrated in FIG. 5, when the terminal apparatus 10 determines in S11 that the position of the first touch point detected in S1 is not in the area of the edge part of the display (S11: No), the process proceeds to S7. On the other hand, when the terminal apparatus 10 determines in S11 that the position of the first touch point detected in S1 is in the area of the edge part of the display (S11: Yes), the process proceeds to the determination process in S12.

In S12, the terminal apparatus 10 determines whether or not the distance between the detected touch points is equal to or longer than a predetermined threshold. As described with reference to FIG. 2, the distance between the contact position of the finger of the hand holding the terminal apparatus 10 and the contact position of the operation finger tends to be longer than the distance of the contact positions for an ordinary multi-touch operation for performing a pinch operation. It is noted that the threshold can be stored as determination information in advance in a predetermined storage area in the auxiliary memory 13 as is the case with the setting information for the area of the edge part used in S11.

The terminal apparatus 10 calculates the distance between the touch points based on the positions of the first and second touch points detected in S1 and S2 respectively, for example. And when the terminal apparatus 10 determines that the distance between the touch points is shorter than the predetermined threshold (S12: No), the process proceeds to S7. On the other hand, when the terminal apparatus 10 determines that the distance between the touch points is equal to or longer than the predetermined threshold (S12: Yes), the process proceeds to S13 to enable the timer.

As for the processes for enabling the timer, the contact position of the finger of the hand holding the terminal apparatus 10 does not tend to move from the touch point at least during the touch operation. It is noted that the setting value of the timer can be determined in advance by measuring operation time durations of single-touch operations etc., for example. The terminal apparatus 10 can store the determined setting value of the timer in a predetermined storage area in the auxiliary memory 13, for example.

The terminal apparatus 10 enables the timer to which a predetermined period is set and proceeds with the process to the determination process in S14. The terminal apparatus 10 determines in S14 whether or not the distance of the movement of the first touch point detected in S1 is equal to or shorter than a predetermined threshold. The position of the touch point may move in a predetermined area due to a swing or a tilt occurred in a moving vehicle etc. even when the user holds the terminal apparatus 10 with the hand. It is noted that an allowable distance can be determined as the above threshold and stored in a predetermined storage area in the auxiliary memory 13.

When the terminal apparatus 10 determines in S14 that the distance of the movement of the first touch point detected in S1 becomes longer than the predetermined threshold before the time set to the timer enabled in S13 elapses (S14: No), the process proceeds to S7. On the other hand, when the terminal apparatus 10 determines in S14 that the distance of the movement of the first touch point detected in S1 is equal to or shorter than the predetermined threshold until the time set to the timer enabled in S13 elapses (S14: Yes), the process proceeds to the determination process in S5.

It is noted that the processes performed in S11 to S14 in the terminal apparatus 10 are examples of steps for determining whether or not the first contact meets a predetermined condition. In addition, the CPU 11 etc. in the terminal apparatus 10 performs the processes in S11 to S14 as an example of the process for determining whether or not the first contact meets a predetermined condition.

As described above, the terminal apparatus 10 in Process Example 2 can distinguish between the operation finger and the finger of the hand holding the terminal apparatus 10 by determining the area of the contact position of one touch point. In addition, the terminal apparatus 10 in Process Example 2 can distinguish between the operation finger and the finger of the hand holding the terminal apparatus 10 by determining the distance between the detected touch points even when one touch point is detected in the predetermined contact area. Further, the terminal apparatus 10 in Process Example 2 can distinguish between the operation finger and the finger of the hand holding the terminal apparatus 10 by determining the distance of the movements of the touch points in a certain period even when the distance between one touch point detected in the predetermined contact area and the other touch point becomes longer. Moreover, the terminal apparatus 10 determines the magnitude (high and low) relationship between the pressures at the touch points. As a result, even when the user holds the terminal apparatus 10 with one finger placed on the edge part of the display and moves the other finger on the display to perform a pinch operation, the terminal apparatus 10 can appropriately recognize a multi-touch operation using the fingers.

Process Example 3

Figure 6:
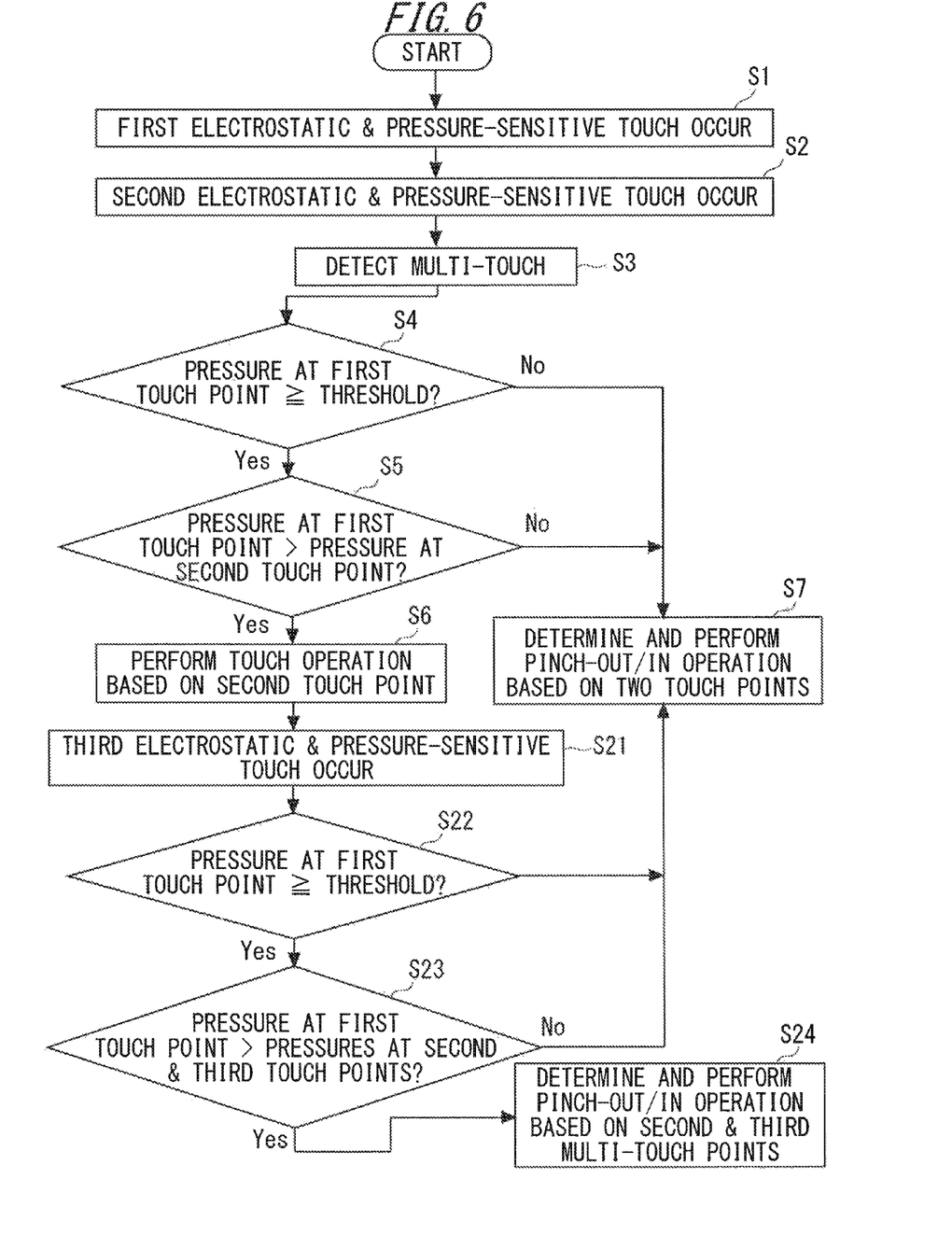
FIG. 6 is a flowchart exemplifying processes for preventing erroneous operations in process example 3 according to the present embodiment.

Next, the processes for preventing an erroneous operation when a multi-touch operation is detected are described with reference to the flowchart as illustrated in FIG. 6. The processes for preventing erroneous operations in Process Examples 1 and 2 assume multi-touch operations based on two touch points. Additionally, the erroneous operations can be prevented in Process Example 3 when the third touch point is detected.

The processes for preventing the erroneous operation as illustrated in FIG. 6 differs from the processes as illustrated in FIG. 4 in that the processes in FIG. 6 include S21 to S24. Therefore, the processes in S21 to S24 are mainly described in the following descriptions.

In the flowchart as illustrated in FIG. 6, the terminal apparatus 10 detects the third touch point (S21) with the first and second touch points still detected after the processes for preventing the erroneous operation as illustrated in FIG. 4 are performed. It is noted that the process in S21 is similar to the processes performed in S1 and S2.

In S22, the terminal apparatus 10 detecting the third touch point determines whether or not the pressure at the first touch point detected in S1 is equal to or higher than a predetermined threshold. When the terminal apparatus 10 performs the process in S22, the terminal apparatus 10 can determine that the third touch point is detected with the finger of the hand holding the terminal apparatus 10 still being in contact with the touch panel. It is noted that the threshold used in the determination process in S22 is preferably the threshold used in the determination process in S4.

When the terminal apparatus 10 determines in S22 that the pressure at the first touch point detected in S1 is lower than a predetermined threshold (S22: No), the process proceeds to S7. On the other hand, when the terminal apparatus 10 determines in S22 that the pressure at the first touch point detected in S1 is equal to or higher than the predetermined threshold (S22: Yes), the process proceeds to S23.

When the terminal apparatus 10 determines "No" in S22, this means that a multi-touch operation with three touch points occurs and the pressures at the first and second touch points are lower than the threshold. Thus, the terminal apparatus 10 proceeds with the process to S7 and performs processes for a normal multi-touch operation based on the detection of the multi-touch operation. However, when the terminal apparatus 10 determines "No" in S22, the terminal apparatus 10 may continue the multi-touch operation based on the first and second touch points as described with reference to FIG. 4 etc. Instead, the terminal apparatus 10 may perform a multi-touch operation based on the second and third touch points or a multi-touch operation based on the first and third touch points, for example. Further, the terminal apparatus 10 may perform a multi-touch operation based on any two touch points at which the pressures are lower than the threshold by determining whether or not each pressure at each touch point is equal to or higher than the threshold to determine which touch point the touch point of the finger of the hand holding the terminal apparatus 10 is. It is noted that when the terminal apparatus 10 determines that a touch point at which the pressure is equal to or higher than the threshold does not exist after a follow-up pressure determination, the terminal apparatus 10 can use any two of the above touch points to perform a multi-touch operation accordingly.

In S23, the terminal apparatus 10 determines the magnitude (high and low) relationship between the pressures at the touch points detected in S1, S2 and S21. For example, the terminal apparatus 10 compares among the pressure at the first touch point detected in S1, the pressure at the second touch point detected in S2 and the pressure at the third touch point detected in S21. When the terminal apparatus 10 determines in S23 that the pressure at the first touch point is not higher than the pressures at the second and third touch points (S23: No), the process proceeds to S7.

When the terminal apparatus 10 determines "No" in S23, this means that the multi-touch operation is based on three touch points and a touch point at which the pressure is equal to or higher than the threshold exists other than at the first touch point. In this case, the terminal apparatus 10 can proceed with the process to S7 to perform a normal multi-touch operation based on the detected touch points. For example, the terminal apparatus 10 may continue the multi-touch operation based on the first and second touch points as described with reference to FIG. 4 etc. In addition, since the pressure at the first touch point is equal to or higher than the threshold, the terminal apparatus 10 can perform a multi-touch operation based on the second and third touch points. Further, the terminal apparatus 10 may invalidate the pressure at the first touch point which is equal to or higher than the threshold and also invalidate the pressures at touch points which are higher than the pressure at the first touch point. In this case, the terminal apparatus 10 can perform a single-touch operation based on the pressure at a touch point which is lower than the pressure at the first touch point or continue to perform the process in S6. Moreover, the terminal apparatus 10 may enable the timer, determine the distance of the movement of each touch point, invalidate the touch point at which the distance is the shortest, and perform a multi-touch operation based on the remaining touch points.

On the other hand, when the terminal apparatus 10 determines in S23 that the pressure at the first touch point is higher than the pressures at the second and third touch points (S23: Yes), the process proceeds to S24. When the terminal apparatus 10 determines "Yes" in S23, the terminal apparatus determines that the touch operation at the third touch point occurs in addition to the single touch operation at the second touch point detected in S6 and then proceeds with the process to S24. The terminal apparatus 10 performs in S24 a multi-touch operation based on the second touch point detected in S2 and the third touch point detected in S21.

It is noted that the process performed in S21 by the terminal apparatus 10 is an example of a process for detecting the contact position of the third contact and the pressure applied by the third contact. In addition, the CPU 11 etc. in the terminal apparatus 10 performs the process in S21 as an example of the process for detecting the contact position of the third contact and the pressure applied by the third contact.

Furthermore, the process performed in S23 by the terminal apparatus 10 is an example of a process for determining the magnitude relationship between the pressure applied by the first contact and the pressure applied by the third contact. In addition, the CPU 11 etc. in the terminal apparatus 10 performs the process in S23 as an example of the process for obtaining the contact position of the third contact and the pressure applied by the third contact.

Moreover, the process performed in S24 by the terminal apparatus 10 is an example of a process for invalidating the contact position of the first contact when the first contact meets a predetermined condition and the pressure applied by the first contact is higher than the pressures applied by the second and third contacts. In addition, the CPU 11 etc. in the terminal apparatus 10 performs the process in S24 as an example of the process for invalidating the contact position of the first contact when the first contact meets a predetermined condition and the pressure applied by the first contact is higher than the pressures applied by the second and third contacts.

As described above, the terminal apparatus 10 in Process Example 3 can determine whether or not the third touch point is a touch point which occurs as a result of a user operation by performing the determination processes in S22 and S23. And when the terminal apparatus 10 performs the determination processes in S22 and S23 to determine that the third touch point is the touch point which occurs as a result of the user operation, the terminal apparatus 10 can perform a multi-touch operation using the newly occurred touch point. On the other hand, when the terminal apparatus 10 determines "No" in S22 and S23, the terminal apparatus 10 can continue the multi-touch operation of the first and second touch points, to which the determination processes have already been performed. Thus, since the terminal apparatus 10 according to the present embodiment can determine user operations appropriately even when the third touch point is detected as described above, erroneous operations can be reduced in the terminal apparatus 10.

Process Example 4

Figure 7:
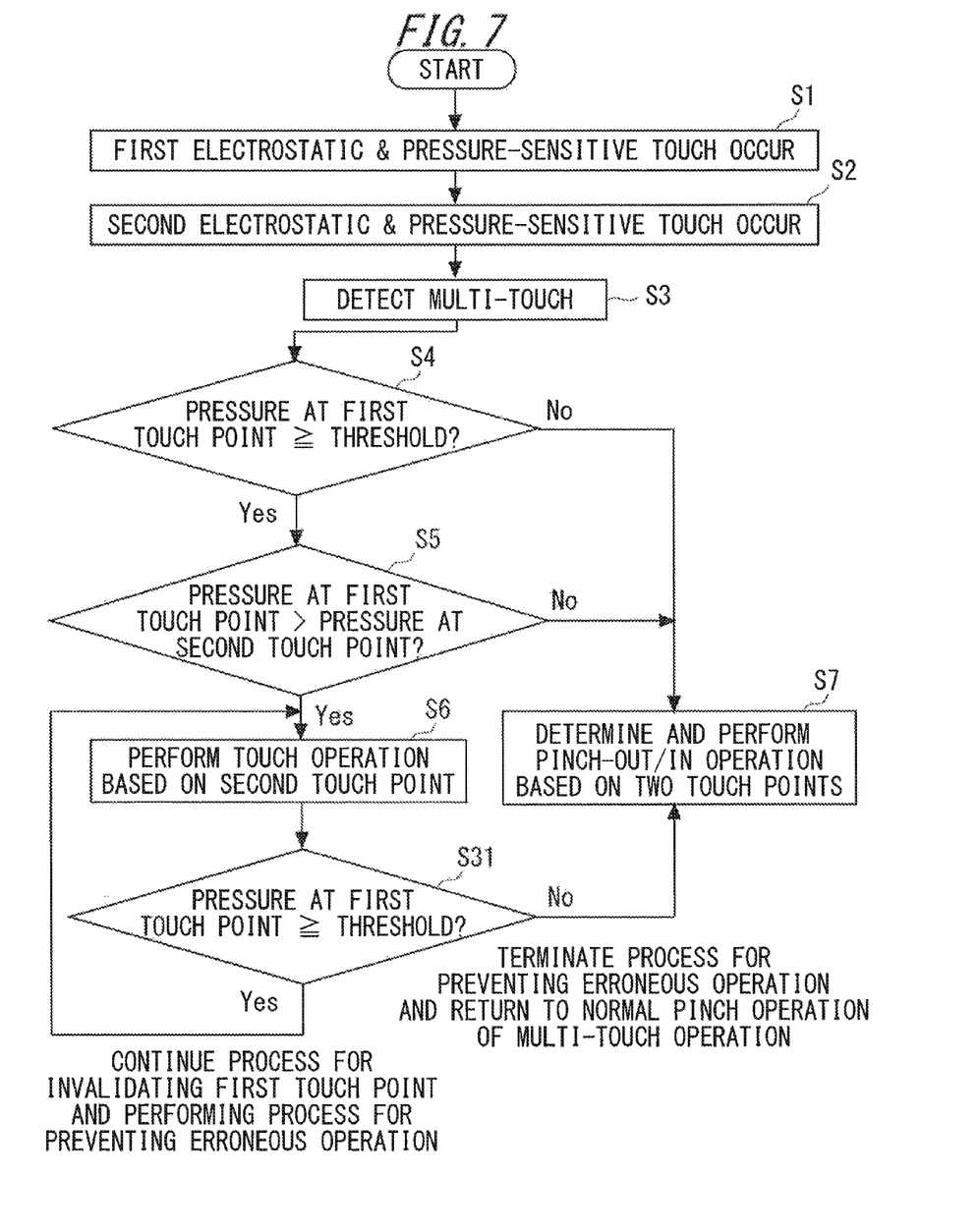
FIG. 7 is a flowchart exemplifying processes for preventing erroneous operations in process example 4 according to the present embodiment.

Next, the processes for preventing an erroneous operation when a multi-touch operation is detected in Process Example 4 are described with reference to the flowchart as illustrated in FIG. 7. In the processes for preventing the erroneous operation in Process Example 4 as illustrated in FIG. 7, the terminal apparatus 10 performs processes for continuing to monitor the pressure at one touch point after the processes in FIG. 4 for preventing the erroneous operation when the multi-touch operation is detected are performed.

The processes for preventing the erroneous operation as illustrated in FIG. 7 differ from the processes as illustrated in FIG. 4 in that the processes in FIG. 7 include S31. Therefore, the process in S31 is mainly described in the following descriptions.

In the flowchart as illustrated in FIG. 7, the terminal apparatus 10 determines in S31 whether or not the pressure at the first touch point detected in S1 is equal to or higher than a predetermined threshold in order to monitor the contact of the finger of the hand holding the terminal apparatus 10. The terminal apparatus 10 can determine that the finger of the hand holding the terminal apparatus 10 is still in contact with the touch panel by determining that the pressure at the first touch point is equal to or higher than the predetermined threshold. It is noted that the determination process in S31 is the determination process in S4, for example.

When the terminal apparatus 10 determines in S31 that the pressure at the first touch point detected in S1 is equal to or higher than the predetermined threshold (S31: Yes), the terminal apparatus 10 proceeds with the process to S6 and invalidates the first touch point to continue the processes for preventing erroneous operations. On the other hand, when the terminal apparatus 10 determines in S31 that the pressure at the first touch point detected in S1 is lower than the predetermined threshold (S31: No), the process proceeds to S7. The terminal apparatus 10 performs the process in S7 to complete the processes for preventing erroneous operations and performs normal multi-touch operations such as pinch operations.

As described above, since the terminal apparatus 10 in Process Example 4 continues to monitor the pressure at one touch point, the terminal apparatus 10 can continue the processes for preventing erroneous operations to invalidate the touch point of the finger of the hand holding the terminal apparatus 10.

Variation Example

In Process Example 2 as illustrated in FIG. 5, the processes for preventing the erroneous operations are processes performed in S11 to S14 and S5 to invalidate the touch point of the finger of the hand holding the terminal apparatus 10. In a variation example, the terminal apparatus 10 may performs one of the processes in S11 and S14 as illustrated in FIG. 5. In addition, the terminal apparatus 10 can combine any two of the processes in S4 in FIG. 4, S5, S11 and S14 in FIG. 5 to perform the processes for preventing the erroneous operations to invalidate the touch point of the finger of the hand holding the terminal apparatus 10.

<<Computer Readable Recording Medium>>

It is possible to record a program which causes a computer to implement any of the functions described above on a computer readable recording medium. In addition, by causing the computer to read in the program from the recording medium and execute it, the function thereof can be provided.

The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory).

A terminal apparatus according to the embodiments can reduce erroneous operations when multi-touch operations are detected.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A terminal apparatus, comprising:
   a touch panel;
   a controller to acquire a first coordinate indicating a contact position of a first contact on the touch panel, a first value indicating a pressure applied to the touch panel by the first contact, a second coordinate indicating a contact position of a second contact on the touch panel and a second value indicating a pressure applied to the touch panel by the second contact; and
   a processor executing a process that causes the terminal apparatus to:
      determine based on the first coordinate and the first value whether or not the contact position of the first contact meets a predetermined condition;
      determine a magnitude relationship between the first value and the second value; and
      invalidate the contact position of the first contact when the terminal apparatus determines that the contact position of the first contact meets the predetermined condition and that the first value is equal to or higher than the second value.

2. The terminal apparatus according to claim 1, wherein the processor executes the process that further causes the terminal apparatus to perform a process according to an input operation based on the contact position of the first contact and the contact position of the second contact when the terminal apparatus determines that the contact position of the first contact meets the predetermined condition and that the first value is lower than the second value.

3. The terminal apparatus according to claim 1, further comprising:
a controller to acquire a third value indicating a pressure applied to the touch panel by a third contact on the touch panel,
wherein the processor executes the process that further causes the terminal apparatus to:
determine a magnitude relationship between the first value and the third value; and
invalidate the contact position of the first contact when the terminal apparatus determines that the contact position of the first contact meets the predetermined condition and that the first value is equal to or higher than the second value and the third value.

4. The terminal apparatus according to claim 1, wherein the predetermined condition is that the first value is equal to or higher than a predetermined value.

5. The terminal apparatus according to claim 1, wherein the predetermined condition is that the first coordinate is in a predetermined area on the touch panel.

6. The terminal apparatus according to claim 5, wherein the predetermined condition further includes a condition that a distance between the first coordinate and the second coordinate is equal to or longer than a predetermined value.

7. The terminal apparatus according to claim 6, wherein the predetermined condition further includes a condition that a distance of a movement of the first coordinate during a predetermined time period is equal to or shorter than a predetermined value.

8. A non-transitory recording medium storing a program that causes a computer to execute a process comprising:
acquiring a first coordinate indicating a contact position of a first contact on the touch panel, a first value indicating a pressure applied to the touch panel by the first contact, a second coordinate indicating a contact position of a second contact on the touch panel and a second value indicating a pressure applied to the touch panel by the second contact;
determining based on the first coordinate and the first value whether or not the contact position of the first contact meets a predetermined condition;
determining a magnitude relationship between the first value and the second value; and
invalidating the contact position of the first contact when the process determines that the contact position of the first contact meets the predetermined condition and that the first value is equal to or higher than the second value.

9. The non-transitory recording medium according to claim 8, wherein the process further comprises:
performing a process according to an input operation based on the contact position of the first contact and the contact position of the second contact when the process determines that the contact position of the first contact meets the predetermined condition and that the first value is lower than the second value.

10. The non-transitory recording medium according to claim 8, wherein the process further comprises:
acquiring a third value indicating a pressure applied to the touch panel by a third contact on the touch panel;
determining a magnitude relationship between the first value and the third value; and
invalidating the contact position of the first contact when the process determines that the contact position of the first contact meets the predetermined condition and that the first value is equal to or higher than the second value and the third value.

11. The non-transitory recording medium according to claim 8, wherein the predetermined condition is that the first value is equal to or higher than a predetermined value.

12. The non-transitory recording medium according to claim 8, wherein the predetermined condition is that the first coordinate is in a predetermined area on the touch panel.

13. The non-transitory recording medium according to claim 12, wherein the predetermined condition further includes a condition that a distance between the first coordinate and the second coordinate is equal to or longer than a predetermined value.

14. The non-transitory recording medium according to claim 13, wherein the predetermined condition further includes a condition that a distance of a movement of the first coordinate during a predetermined time period is equal to or shorter than a predetermined value.

15. An input correction method, comprising:
acquiring by a processor a first coordinate indicating a contact position of a first contact on the touch panel, a first value indicating a pressure applied to the touch panel by the first contact, a second coordinate indicating a contact position of a second contact on the touch panel and a second value indicating a pressure applied by the second contact;
determining by the processor based on the first coordinate and the first value whether or not the contact position of the first contact meets a predetermined condition;
determining by the processor a magnitude relationship between the first value and the second value; and
invalidating by the processor the contact position of the first contact when the processor determines that the contact position of the first contact meets the predetermined condition and that the first value is equal to or higher than the second value.

16. The input correction method according to claim 15, further comprising:
performing by the processor a process according to an input operation based on the contact position of the first contact and the contact position of the second contact when the processor determines that the contact position of the first contact meets the predetermined condition and the first value is lower than the second value.

17. The input correction method according to claim 15, further comprising:
acquiring by the processor a third value indicating a pressure applied to the touch panel by a third contact on the touch panel;
determining by the processor a magnitude relationship between the first value and the third value; and
invalidating by the processor the contact position of the first contact when the processor determines that the contact position of the first contact meets the predetermined condition and that the first value is equal to or higher than the second value and the third value.

18. The input correction method according to claim 15, wherein the predetermined condition is that the first value is equal to or higher than a predetermined value.

19. The input correction method according to claim 15, wherein the predetermined condition is that the first coordinate is in a predetermined area on the touch panel.

20. The input correction method according to claim 19, wherein the predetermined condition further includes a condition that a distance between the first coordinate and the second coordinate is equal to or longer than a predetermined value.

* * * * *